Feb. 7, 1961 F. A. SUMMERLIN 2,970,471
RATE OF CLIMB METER
Filed Sept. 8, 1958
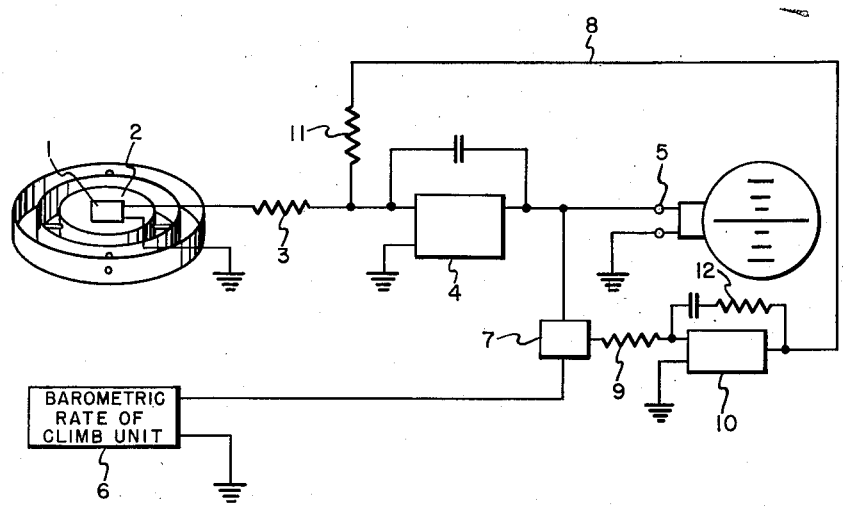
INVENTOR
FREDERICK A. SUMMERLIN
BY
ATTORNEY

United States Patent Office 2,970,471
Patented Feb. 7, 1961

2,970,471

RATE OF CLIMB METER

Frederick Arthur Summerlin, Isleworth, England, assignor to The Sperry Gyroscope Company Limited, Brentford, England, a British company Filed Sept. 8, 1958, Ser. No. 759,614

5 Claims. (Cl. 73—179)

This invention relates to rate of climb instruments for aircraft.

Barometric rate of climb devices are known for example in the form of a leaky bellows. These, however, are slow in responding to changes in the rate of climb of the aircraft and so, although giving an accurate indication of the rate of climb over a long term, do not give accurate instantaneous indications of the rate of climb. Further, in helicopters barometric altimeters are unreliable when the aircraft is near the ground due to the effect of the rotor, and other effects.

A rate of climb indication may alternatively be obtained by integrating the output signal from a vertical accelerometer. A rate of climb indication obtained from such a signal is however, subject to cumulative errors due, for example, to the accelerometer being positioned out of the vertical, null drift, and so on.

According to the invention the improved rate of climb instrument includes an accelerometer for sensing vertical acceleration arranged to generate an output signal measure of the generally-vertical acceleration of the craft, means for integrating the output from the accelerometer to give an integrated output representing approximately the instantaneous rate of vertical climb, a barometric rate-of-climb instrument whose output is compared with the said integrated output, and a monitoring feedback means connected to supply a signal dependent on any difference between the rates-of-climb derived respectively from the accelerometer and the barometric instrument to a point on the input side of the integrating means in the sense that nulls the difference, the feedback means including an integrator.

In this way, the accelerometer, which can measure accurately instantaneous rates-of-climb, is corrected by the barometric device which can measure rates-of-climb over a long term. The integrator of the monitoring means ensures that any constant errors in the instrument at the output of the integrating means controlled by the accelerometer decrease until they are eliminated.

The accelerometer may be a gyroscope with its rotor case out-of-balance about a horizontal gimbal axis but, preferably, is an accelerometer of conventional form, i.e. a spring supported weight mounted for movement along an axis, and is mounted on a gyro-horizon so that the axis is always vertical or nearly so. In the noted instance where the accelerometer is a gyroscope with its rotor casing out of balance, the feedback signal could be supplied to a torquer to simulate a correcting acceleration and thus to vary the rate of precession of the gyroscope in accordance with the net apparent acceleration force.

The invention may be carried into practice in different ways and one embodiment will be described, by way of example only, with reference to the accompanying drawing of which the sole figure is a schematic diagram of a rate of climb instrument.

A conventional accelerometer 1 is mounted on the rotor casing 2 of a gyroscope in a gyro-horizon unit to give an electrical output signal relative to earth which is proportional to the acceleration of the casing in a generally vertical direction, and hence of the aircraft in which the gyro-horizon unit is fixed. The accelerometer output is supplied through a 1 megohm resistor 3 to the input of an integrating means consisting of an amplifier 4 with capacitive feedback whose output 5 is used to operate a suitable meter to give an indication of the vertical velocity or rate-of-climb of the aircraft.

In order to correct the indication for cumulative errors, due, for example, to wander of the gyro-horizon from the horizontal, the output 5 of the integrating means 4 is compared with an electrical rate of change of altitude signal provided by a barometric rate of climb means 6 including a leaky bellows having one end of the axis along which expansion takes place fixed, and the other end connected to an electrical pick-off which provides an output when relative movement takes place between the two ends of the bellows. As stated above, such barometric means measures quite accurately the average rate-of-climb over a period, although it is subject to delay and a reading corresponding to its output may be quite different from the instantaneous rate-of-climb of the craft.

The signal from the barometric means 6 and a portion of the output from the integrating means 4 are both fed to a comparing means 7 consisting of a simple adding circuit. Any difference between the two is fed through a 10 megohm resistor 9 to a second integrator 10. The output of the integrator i.e. the integrated error signal is supplied to the input of the integrating means 4 through a feedback path 8 containing a 10 megohm resistor 11. The integrator 10 indicated also consists of an amplifier with capacitive feedback. In this instance however the capacitive feedback circuit includes a damping resistor 12.

The monitoring input supplied to the integrating means 4 from the second integrator 10 acts to remove any cumulative error in the rate of climb signal obtained from the accelerometer output, because the feedback signal added to the input to the integrating means 4 changes until the constant error is reduced to a null.

In one suitable arrangement the following assumptions are made.

Maximum rate of climb or descent 50 ft./sec.
Maximum vertical acceleration 15 ft./sec.$^2$
Maximum horizontal acceleration 10 ft./sec.$^2$
Constant gyro erection rate 3°/min.
Accelerometer sensitivity ½ volt/ft./sec.
Indicator sensitivity ½ volt/ft./sec.
Barometric rate of climb sensitivity ½ volt/ft./sec.

The circuit is such that the system has the following transfer functions.

$$\frac{V}{A} = \frac{P}{\left(P^2 + \frac{P}{30} + \frac{1}{900}\right)}$$

$$\frac{V}{B} = \frac{P + \frac{1}{30}}{15\left(P^2 + \frac{P}{30} + \frac{1}{900}\right)}$$

Where V=Indicator reading (volts)
  A=Accelerometer output (volts)
  B=Barometric rate of climb output (volts), and P is the differential operator.

From these transfer functions the following points should be noted.

(a) From a short term point of view $$\frac{V}{A} = \frac{1}{P}$$

i.e., V is a rate of climb indication from an inertial source.

(b) From a long term point of view $$\frac{V}{A}=0$$

i.e., zero errors in the accelerometer do not affect the indication.

(c) From a short term aspect $$\frac{V}{B}=\frac{1}{15P}$$

which is small. From a long term aspect $$\frac{V}{B}=2$$

i.e., the long term indication is entirely derived from a barometric source.

(d) The instrument is adequately damped (.5 critical) by the damping means provided in the feedback circuit.

What is claimed is:

1. In an aircraft rate of climb instrument, an accelerometer for sensing acceleration of the craft in a vertical direction, integrating means controlled by the accelerometer providing an output in accordance with the instantaneous rate of vertical climb of the craft, and means for monitoring the accelerometer to reduce the error thereof to null including barometric means providing an output in accordance with the rate of change of altitude of the craft, comparing means providing an output in accordance with the difference between the outputs of said integrating means and said barometric means, and a feedback circuit including an integrator for the output of said comparing means connected to said integrating means to provide a monitoring input thereto.

2. An instrument of the character claimed in claim 1, in which said monitoring feedback circuit includes damping means.

3. In an aircraft rate of climb instrument, a vertically stabilized accelerometer providing an output in accordance with acceleration of the craft in a vertical direction, means for integrating the output of said accelerometer providing an output in accordance with the instantaneous rate of vertical climb of the craft, and means for correcting the error in the output of the accelerometer including barometric means for providing an output in accordance with the rate of change of altitude of the craft, comparing means providing an output in accordance with the difference between the outputs of said integrating means and said barometric means, and feedback means including an integrator for the output of said comparing means connected to said integrating means to provide a corrective input thereto.

4. An instrument of the character claimed in claim 3, in which said corrective feedback means includes damping means.

5. An aircraft rate of climb instrument including a meter, means for sensing vertical acceleration of the craft including an integrator providing an output for operating the meter, and means for monitoring the acceleration sensing means to reduce the error thereof to null including barometric means for providing an output in accordance with the rate of change of altitude of the craft, comparing means providing an output in accordance with the difference between the outputs of said integrator and barometric means, and feedback means including means for integrating the output of said comparing means providing a monitoring input to the integrator.

References Cited in the file of this patent

UNITED STATES PATENTS 2,856,772     Strihafka     Oct. 21, 1958

FOREIGN PATENTS 781,374     Great Britain     Aug. 21, 1957